United States Patent
Liu (10) Patent No.: US 10,153,475 B2
(45) Date of Patent: Dec. 11, 2018

(54) ELECTRICAL CONNECTOR FOR PORTABLE MULTI-CELL ELECTRICAL ENERGY STORAGE DEVICE

(71) Applicant: GOGORO INC., Hong Kong (CN)

(72) Inventor: Tai-Tsun Liu, New Taipei (TW)

(73) Assignee: Gogoro Inc., Hong Kong (CN)

( * ) Notice: Subject to any disclaimer, the term of this patent is extended or adjusted under 35 U.S.C. 154(b) by 0 days.

(21) Appl. No.: 15/151,188

(22) Filed: May 10, 2016

(65) Prior Publication Data
US 2016/0336575 A1    Nov. 17, 2016

Related U.S. Application Data

(60) Provisional application No. 62/159,594, filed on May 11, 2015.

(51) Int. Cl.
H01M 2/20 (2006.01)
H01R 13/24 (2006.01)

(52) U.S. Cl.
CPC ........... H01M 2/206 (2013.01); H01M 2/204 (2013.01); H01R 13/245 (2013.01)

(58) Field of Classification Search
CPC .... H01M 2/206; H01M 2/204; H01M 2/1077; H01M 2/0202; H01M 2/0525; H01R 13/245
USPC ........................................................ 439/627
See application file for complete search history.

(56) References Cited

U.S. PATENT DOCUMENTS

| D221,081 S | 7/1971 | Kahn |
| D227,773 S | 7/1973 | Dafler et al. |
| 5,866,276 A | 2/1999 | Ogami et al. |
| D472,209 S | 3/2003 | Wada et al. |
| D472,210 S | 3/2003 | Tada et al. |
| D476,294 S | 6/2003 | Tada et al. |
| D476,620 S | 7/2003 | Tada et al. |
| D573,948 S | 7/2008 | Itagaki et al. |
| 7,433,794 B1 | 10/2008 | Berdichevsky et al. |
| D582,416 S | 12/2008 | Duarte et al. |

(Continued)

FOREIGN PATENT DOCUMENTS

| CA | 2 865 976 A1 | 9/2013 |
| EP | 2 302 727 A1 | 3/2011 |

(Continued)

OTHER PUBLICATIONS

International Search Report and Written Opinion, dated Oct. 18, 2016, for corresponding International Application No. PCT/US2016/031653, 12 pages.

(Continued)

Primary Examiner — Jean F Duverne
(74) Attorney, Agent, or Firm — Perkins Coie LLP (57) ABSTRACT

Electrical connectors for electrically connecting individual portable electrical energy storage cells making up a plurality of portable electrical energy storage cells that are part of a portable electrical energy storage device for powering portable devices such as vehicles or consumer electronics include bands of reduced cross-sectional area. The electrical connectors include conductive bands that promote reliable attachment between the electrical connector and portable electrical energy storage cells and provide the ability to electrically isolate failing or damaged cells.

12 Claims, 3 Drawing Sheets

(56) References Cited

U.S. PATENT DOCUMENTS

| | | |
|---|---|---|
| D588,537 S | 3/2009 | Allen |
| D603,792 S | 11/2009 | Ferro |
| 7,749,650 B1 | 7/2010 | Hermann |
| 7,993,155 B2 | 8/2011 | Heichal et al. |
| 8,006,793 B2 | 8/2011 | Heichal et al. |
| 8,013,571 B2 | 9/2011 | Agassi et al. |
| 8,114,540 B2 | 2/2012 | Trester et al. |
| 8,286,743 B2 | 10/2012 | Rawlinson |
| 8,361,642 B2 | 1/2013 | Hermann et al. |
| 8,367,233 B2 | 2/2013 | Hermann et al. |
| 8,481,191 B2 | 7/2013 | Hermann |
| 8,541,126 B2 | 9/2013 | Hermann et al. |
| D693,765 S | 11/2013 | Workman et al. |
| 8,609,268 B2 * | 12/2013 | Fuhr .................. H01M 2/1077 429/120 |
| D711,820 S | 8/2014 | Zeng |
| D723,462 S | 3/2015 | Druker et al. |
| D733,050 S | 6/2015 | Chiang |
| D733,651 S | 7/2015 | Liu |
| D738,302 S | 9/2015 | Jeong et al. |
| 9,559,393 B2 * | 1/2017 | Obasih .............. H01M 10/0525 |
| 2003/0082439 A1 * | 5/2003 | Sakakibara ......... H01M 2/0202 429/120 |
| 2006/0073377 A1 | 4/2006 | Al-Hallaj et al. |
| 2008/0050637 A1 | 2/2008 | Prakash et al. |
| 2008/0220321 A1 | 9/2008 | Yonemochi et al. |
| 2008/0254357 A1 | 10/2008 | Liu |
| 2008/0318121 A1 * | 12/2008 | Takagi ................ H01M 2/1072 429/120 |
| 2009/0075163 A1 | 3/2009 | Shevock et al. |
| 2010/0028758 A1 | 2/2010 | Eaves et al. |
| 2010/0104928 A1 | 4/2010 | Nishino et al. |
| 2010/0114800 A1 | 5/2010 | Yasuda et al. |
| 2011/0008655 A1 | 1/2011 | White et al. |
| 2011/0091749 A1 | 4/2011 | Chow |
| 2011/0159340 A1 | 6/2011 | Hu et al. |
| 2011/0189525 A1 | 8/2011 | Palanchon et al. |
| 2012/0018116 A1 | 1/2012 | Mathur et al. |
| 2012/0225331 A1 | 9/2012 | Tartaglia |
| 2012/0244399 A1 | 9/2012 | Tartaglia |
| 2012/0312615 A1 | 12/2012 | Rawlinson |
| 2013/0071717 A1 | 3/2013 | Muniz |
| 2013/0153317 A1 | 6/2013 | Rawlinson et al. |
| 2013/0216884 A1 | 8/2013 | Takasaki et al. |
| 2014/0072855 A1 | 3/2014 | Schaefer |
| 2014/0079978 A1 | 3/2014 | Al-Hallaj et al. |
| 2014/0368032 A1 | 12/2014 | Doerndorfer |
| 2015/0086834 A1 | 3/2015 | Cho |

FOREIGN PATENT DOCUMENTS

| | | |
|---|---|---|
| EP | 2 610 943 A1 | 7/2013 |
| EP | 2 181 481 B1 | 10/2013 |
| JP | 2009-21223 A | 1/2009 |
| JP | 2013-120694 A | 6/2013 |
| WO | 2013/128007 A2 | 9/2013 |
| WO | 2013/128009 A2 | 9/2013 |
| WO | 2013/131548 A1 | 9/2013 |
| WO | 2013/1282009 A3 | 9/2013 |

OTHER PUBLICATIONS

International Search Report and Written Opinion, dated Dec. 26, 2014, for corresponding International Application No. PCT/US2014/053418, 16 pages.

International Search Report and Written Opinion, dated Jul. 28, 2016, for corresponding International Application No. PCT/US2016/019910, 11 pages.

\* cited by examiner

ELECTRICAL CONNECTOR FOR PORTABLE MULTI-CELL ELECTRICAL ENERGY STORAGE DEVICE

CROSS-REFERENCE TO RELATED APPLICATIONS

This application claims priority to and the benefit of U.S. Provisional Application No. 62/159,594, filed May 11, 2015, which is hereby incorporated by reference in its entirety.

BACKGROUND

Technical Field

The embodiments described herein relate to electrical connections between portable electrical energy storage cells making up a portable electrical energy storage device, for example, portable electrical energy storage devices used in electric powered devices such as vehicles and consumer electronics.

Description of the Related Art

Batteries such as lithium-ion batteries are known for packing more energy into smaller, lighter units. Lithium-ion batteries have found wide application in powering portable electronic devices such as cell phones, tablets, laptops, power tools and other high-current equipment. Their low weight and high energy density also makes lithium-ion batteries attractive for use in hybrid vehicles and fully electric-powered vehicles.

A potential shortcoming of lithium-ion batteries is their electrolyte solutions. Unlike other types of batteries, in which the electrolytes consist of aqueous solutions of acid or base, the electrolyte in lithium-ion cells typically consists of lithium salts in organic solvents such as ethylene carbonate and ethyl methyl carbonate (which can be flammable).

Under normal operation, charging a lithium-ion battery causes lithium ions in the electrolyte solution to migrate from the cathode through a thin porous polymer separator and insert themselves in the anode. Charge balancing electrons also move to the anode but travel through an external circuit in the charger. Upon discharge, the reverse process occurs, and electrons flow through the device being powered.

In very rare circumstances, internal or external short-circuiting of a lithium-ion battery can occur. For example, the electric-powered device containing the lithium-ion battery can undergo a severe impact or shock resulting in a breach in the battery, which could result in a short circuit. Due to the thin nature of the polymer separator, micrometer-sized metal particles generated during cutting, pressing, grinding, or other battery manufacturing steps can be present or find their way into the battery cell. These small metal particles can accumulate and eventually form a short circuit between the anode and the cathode. Such short circuits are to be avoided because they can result in temperatures at which the cathode may react with and decompose the electrolyte solution, generating heat and reactive gases such as hydrocarbons. Typically, at normal operating temperatures, lithium-ion batteries are very stable; however, above a certain temperature lithium-ion battery stability becomes less predictable, and at an elevated temperature chemical reactions within the battery case will produce gases resulting in an increase in the internal pressure within the battery case. These gases can react further with the cathode, liberating more heat and producing temperatures within or adjacent to the battery that can ignite the electrolyte in the presence of oxygen. When the electrolyte burns, small amounts of oxygen are produced, which may help fuel the combustion. At some point, build-up of pressure within the battery case results in the battery case rupturing. The escaping gas may ignite and combust. Some battery manufacturers design their cells so that, in the unlikely event a cell ruptures and ignites, gases that support combustion exit the cell in predetermined locations and directions. For example, battery cells in the shape of conventional AAA or AA cells may be designed to vent from the terminal ends located at each end of the cell.

In applications where only a single lithium-ion battery is utilized, failure of a battery and the potential for combustion creates an undesirable situation. The severity of this situation is increased when a plurality of lithium-ion batteries are deployed in the form of a battery bank or module. The combustion occurring when one lithium-ion battery fails may produce local temperatures above the temperature at which other lithium-ion batteries are normally stable, causing these other batteries to fail, rupture, and vent gases which then ignite and combust. Thus, it is possible for the rupture of a single cell in a bank of lithium-ion cells to cause other cells in the bank to rupture and discharge gases which ignite and burn. Fortunately, lithium-ion batteries have proven to be very safe, and the failure and consequent rupture of a lithium-ion battery is a very rare event. Nonetheless, efforts have been made to reduce the risk of rupture and ignition of gases exiting a ruptured lithium-ion battery. For example, development of materials used for cathodes has produced lithium-based cathode materials that tolerate heat better than cathodes made from the widely used lithium cobalt oxide. While these more recently developed materials may be more heat tolerant, this benefit comes at a price. For example, lithium manganese oxide cathodes have a lower charge capacity than lithium cobalt oxide and still decompose at high temperatures. Lithium iron phosphate cathodes stand up especially well to thermal abuse; however, their operating voltage and energy density on a volume basis are lower than those of lithium cobalt oxide cathodes.

Other efforts have focused on the polymer separator and its design. For example, it has been proposed to utilize a polymer separator that sandwiches a layer of polyethylene between two layers of polypropylene in an effort to provide a degree of protection against mild overheating. As the temperature of the cell begins to approach that at which the stability of the cell becomes unpredictable, the polyethylene melts and plugs the pores in the polypropylene. When the pores of a polypropylene are plugged by the polyethylene, lithium diffusion is blocked, effectively shutting the cell down before it has a chance to ignite. Other efforts have focused on utilizing polymer separators having melting points higher than polypropylene. For example, separators made from polyimides and separators made from high molecular weight polyethylene and an embedded ceramic layer have been proposed to form a robust higher melting point polymer separator. Formulating and utilizing less flammable electrolytes and nonvolatile, nonflammable ionic liquids, fluoroethers, and other highly fluorinated solvents as battery electrolytes have also been investigated. Researchers have developed lithium-ion batteries that contain no liquids at all. These solid-state batteries contain inorganic lithium-ion conductors, which are inherently nonflammable and are thus very stable, safe, and exhibit long cycle life and shelf life. However, the manufacture of these solid-state batteries requires costly, labor-intensive vacuum deposition methods.

When a portable electrical energy storage device includes a plurality of portable electrical energy storage cells, some of the portable electrical energy storage cells are typically electrically connected to each other. One way to achieve such electrical connection is to attach an electrically conductive member to the terminals of the target portable electrical energy storage cells. In the rare event a portable electrical energy storage cell begins to fail, electric energy flowing to the failing portable electrical energy storage cell from stable portable electrical energy storage cells connected to the same electrically conductive member may promote generation of thermal energy at the failing cell. It is also possible that electrical energy flowing from the failing portable electrical energy storage cell to other stable portable electrical energy storage cells connected to the conductive member may cause the temperature of the stable portable electrical energy storage cells to rise. In both cases, the temperature of the failing or stable electrical energy storage cells can increase to levels where cell stability is less predictable and/or alteration of damage to components of a portable electrical energy storage cell may occur. An unstable or damaged cell may burst or self-ignite.

While thermal fusing, e.g., spot welding, is an effective process to attach electrically conductive members to terminals of portable electrical energy storage cells, such process is not without its challenges. For example, the small size of the conductive members to be welded to terminals of portable electrical energy storage cells make it challenging to reliably contact the conductive members with the terminals of the portable electrical energy storage cells.

Despite efforts to avoid failure or damage to portable electrical energy storage cells, there continues to be a need to reduce exposure of electrical energy storage cells to temperatures which make the cells' stability less predictable and achieves solid and reliable contact between conductive members that are to be thermally fused to terminals of portable electrical energy storage cells.

BRIEF SUMMARY

Embodiments described in this application relate to electrical connectors for electrically connecting portable electrical energy storage cells making up a portable electrical energy storage device, methods of making such electrical connectors and methods for attaching electrical connectors to a portable electrical energy storage cell. Electrical connectors in accordance with embodiments described in this application include features that help protect a failing portable electrical energy storage cell from further damage resulting from electric current flowing to the failing cell from other portable electrical energy storage cells connected to the same electrical connector as the failing cell. Electrical connectors in accordance with embodiments described in this application include features that help protect non-failing portable electrical energy storage cells from damage resulting from electric current flowing from a failing portable electrical energy storage cell to the non-failing portable electrical energy storage cell connected to the same electrical connector as the failing portable electrical energy storage cell.

In embodiments of one described aspect, electrical connectors for electrical connection to each of a plurality of portable electrical energy storage cells making up a portable electrical energy storage device are described. The electrical connector includes an electrically conductive frame and a plurality of integral electrically conductive tabs. Each of the plurality of integral electrically conductive tabs is in electrical communication with the electrically conductive frame. The electrical connector also includes a plurality of integral electrically conductive supports with one integral electrically conductive support of the plurality of electrically conductive supports extending between one of the plurality of integral electrically conductive tabs and the electrically conductive frame. In accordance with embodiments described in the application, the integral electrically conductive support extends between one of the plurality of integral electrically conductive tabs and the electrically conductive frame and includes at least one electrically conductive band. The at least one electrically conductive band having a cross-sectional area less than a cross-sectional area of another portion of the integral electrically conductive support extending from one of the integral electrically conductive tabs.

In embodiments of another described aspect, the integral electrically conductive support includes an upper surface and a lower surface and an opening extending from the upper surface to the lower surface.

In other embodiments, the integral electrically conductive support includes a first edge and a second edge with a first electrically conductive band between the first edge and the opening and a second electrically conductive band between the second edge and the opening.

In yet another embodiment, the integral electrically conductive support extending between the integral electrically conductive tab and the electrically conductive frame includes two electrically conductive bands, each of the two electrically conductive bands having a cross-sectional area less than a cross-sectional area of another other portion of the integral electrically conductive support extending from one of the integral electrically conductive tabs.

In embodiments of another described aspect, the cross-sectional area of one of the two electrically conductive bands is less than the cross-sectional area of the other one of the two electrically conductive bands.

In embodiments of another described aspect, methods of manufacturing an electrical connector for electrical connection to each of a plurality of portable electrical energy storage cells making up a portable electrical energy storage device are described. The methods include providing an electrically conductive substrate and forming a plurality of integral electrically conductive tabs and a plurality of integral electrically conductive supports in the electrically conductive substrate. In accordance with the described methods, one of the plurality of integral electrically conductive supports extends from one of the integral electrically conductive tabs and an electrically conductive band is formed in the electrically conductive support extending from the one of the integral electrically conductive tabs. The electrically conductive band has a cross-sectional area less than a cross-sectional area of another portion of the integral electrically conductive support extending from one of the integral electrically conductive tabs.

In embodiments of another described aspect, the plurality of integral electrically conductive tabs are formed by displacing the integral electrically conductive tab so it lies in a plane different from the plane in which the balance of the electrically conductive substrate lies.

In other embodiments, forming an electrically conductive band includes forming two electrically conductive bands in the integral electrically conductive support extending from one of the plurality of integral electrically conductive tabs. Each of the two electrically conductive bands has a cross-sectional area less than a cross-sectional area of another portion of the integral electrically conductive support extending from one of the integral electrically conductive tabs.

In yet other embodiments, described methods include forming an electrically conductive band in one of the plurality of electrically conductive supports extending from one of the integral conductive tabs by removing a portion of the integral electrically conductive support extending from one of the plurality of integral electrically conductive tabs.

In further embodiments, the cross-sectional area of one of the two electrically conductive bands is less than the cross-sectional area of the other one of the two electrically conductive bands.

Embodiments of aspects described herein include methods of attaching an electrical connector to a portable electrical energy storage cell of a portable electrical energy storage device. The described methods provide a plurality of integral electrically conductive tabs and a plurality of integral electrically conductive support, where one of the plurality of integral electrically conductive supports extends from one of the integral electrically conductive tabs and includes at least one electrically conductive band having a cross-sectional area less than a cross-sectional area of another portion of the integral electrically conductive support extending from one of the integral electrically conductive tabs. In accordance with these and other embodiments, one integral electrically conductive tab from which the one integral electrically conductive support extends is heated and the one integral electrically conductive tab from which the one integral electrically conductive support extends is thermally fused to the portable electrical energy storage cell.

In yet other embodiments of aspects described herein, the integral electrically conductive support extending from one of the integral electrically conductive tabs includes at least two electrically conductive bands, with each of the two electrically conductive bands having a cross-sectional area less than a cross-sectional area of the other portion of the integral electrically conductive support. In certain embodiments, the cross-sectional area of one of the at least two electrically conductive bands is less than the cross-sectional area of another of the at least two electrically conductive bands.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

It will be appreciated that, although specific embodiments of the subject matter of this application have been described herein for purposes of illustration, various modifications may be made without departing from the spirit and scope of the disclosed subject matter. Accordingly, the subject matter of this application is not limited except as by the appended claims.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electrical energy storage cells, e.g., batteries, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment.

The use of ordinals such as first, second and third does not necessarily imply a ranked sense of order, but rather may only distinguish between multiple instances of an act or structure.

Reference to portable electrical power storage device or electrical energy storage device means any device capable of storing electrical power and releasing stored electrical power including, but not limited to, batteries, supercapacitors or ultracapacitors, and modules made up of a plurality of the same. Reference to portable electrical energy storage cell(s) means a chemical storage cell or cells, for instance, rechargeable or secondary battery cells including, but not limited to, nickel-cadmium alloy battery cells or lithium-ion battery cells. A non-limiting example of portable electrical energy storage cells is illustrated in the figures as being cylindrical, e.g., similar in size and shape to conventional AAA size batteries; however, the present disclosure is not limited to this illustrated form factor.

The headings and Abstract of the Disclosure provided herein are for convenience only and do not interpret the scope or meaning of the embodiments.

Generally described, the present disclosure is directed to examples of portable electrical energy storage devices suitable to power electric devices such as electric powered or hybrid type vehicles, e.g., motorcycles, scooters and electric bicycles, electric powered tools, electric powered lawn and garden equipment, and the like, which include one or more electrical connector for making an electrically conductive connection between a plurality of electrical energy storage cells making up the electrical energy storage device. The present disclosure also describes examples of methods of making such electrical connectors and methods of attaching such electrical connectors to portable electrical energy storage cells. Further description of portable electrical energy storage devices and electrical connectors in accordance with embodiments described herein is provided in the context of portable electrical energy storage devices used with electric scooters; however, it should be understood that portable electrical energy storage devices in accordance with embodiments described herein are not limited to applications in electric scooters. In addition, portable electrical energy storage devices are described below with reference to a single electrical energy storage cell module containing a plurality of electrical energy storage cells. The present description is not limited to electrical energy storage devices that include only a single electrical energy storage cell module and encompasses portable electrical energy storage devices that include more than a single electrical energy storage cell module.

Figure 1:
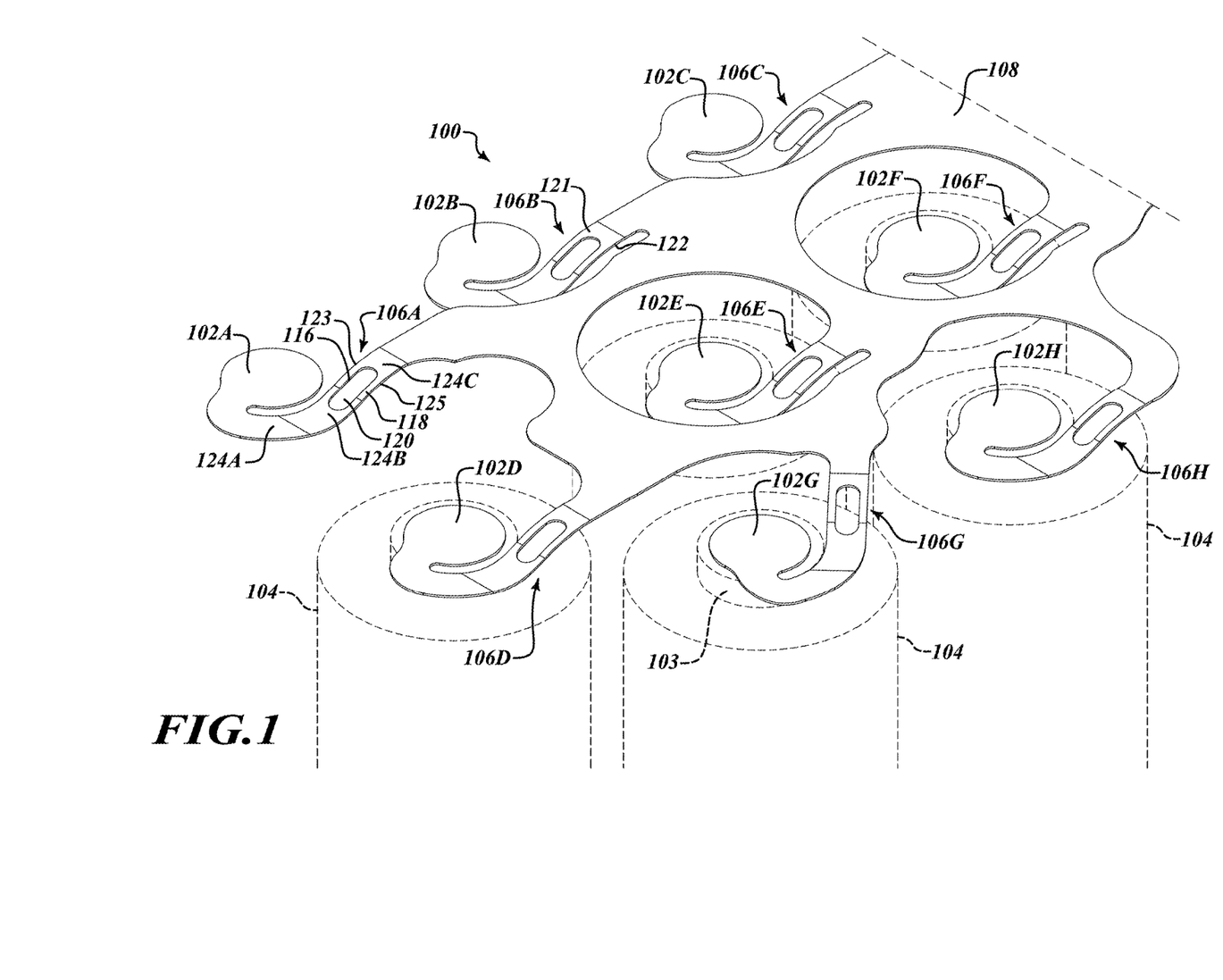
FIG. 1 is an isometric view of an electrical connector for connection to portable electrical energy storage cells of a portable electrical energy storage device, according to one non-limiting illustrated embodiment.
Figure 2:
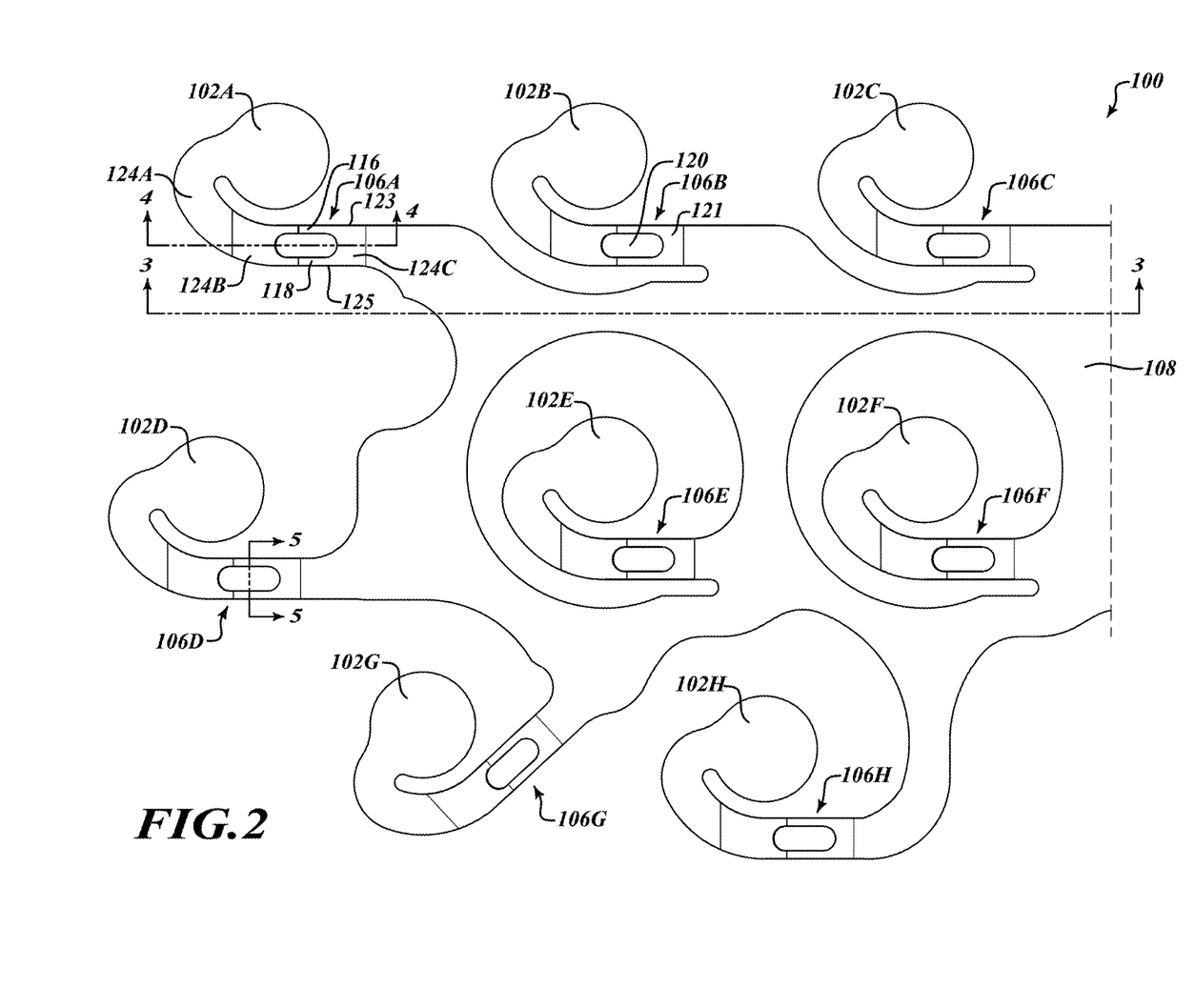
FIG. 2 is an top plan view of the electrical connector of FIG. 1.

Referring to FIG. 1, an exemplary electrical connector 100 formed in accordance with embodiments described herein is an electrically conductive member that includes a plurality of integral electrically conductive tabs 102, each for attachment to a terminal 103 of a respective portable electrical energy storage cell 104 illustrated in broken lines. Though not illustrated, in exemplary embodiments, portable electrical energy storage cells 104 comprise an array or module of portable electrical energy storage cells making up a portion of a portable electrical energy storage device for powering an electrically powered device, such as an electric vehicle. Electrical connector 100 includes a plurality of integral electrically conductive supports 106A-106H. One of the plurality of integral electrically conductive supports 106A-106H extends between one of the respective plurality of integral electrically conductive tabs 102A-102H and an electrically conductive frame 108 of electrical connector 100. Integral electrically conductive supports 106A-106H provide electrical communication (i.e., an electrical connection) between integral electrically conductive tabs 102A-102H and electrically conductive frame 108. In the exemplary embodiment illustrated in FIG. 1, the shape of some of the individual electrically conductive supports 106A-106H differs. It should be understood that the shape of individual electrically conductive supports in accordance with embodiments of an electrical connector described herein can vary from those illustrated in FIG. 1. For example, the shape of all of the individual electrically conductive supports can be the same or the shape of every individual electrically conductive support in accordance with embodiments described herein can be different.

Figure 3:
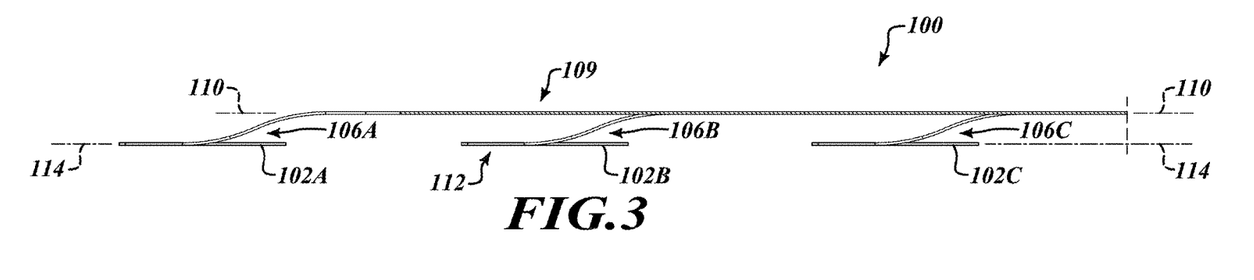
FIG. 3 is a side elevation view of the electrical connector of FIG. 1.

Electrical connector 100 is formed from an electrically conductive material, e.g., a metal or metal alloy. Exemplary metals or metal alloys include nickel and nickel alloys; however, the described embodiments are not limited to nickel and nickel alloys and include other conductive materials that can be thermally fused to terminals of portable electrical energy storage cells. Referring additionally to FIG. 3, in the illustrated exemplary embodiment, electrically conductive frame 108 as used herein refers to the portion of electrical connector 100 that substantially defines a plane 109 schematically identified by line 110 in FIG. 3. As seen in FIG. 3, integral electrically conductive tabs 102A-102H lie in a second plane 112 schematically identified by line 114. In FIGS. 1 and 3, plane 109 is spaced apart from and is above plane 112. Integral electrically conductive supports 106A-106H extend between respective integral electrically conductive tabs 102A-102H and electrically conductive frame 108 and comprise portions of the electrical connector 100 that do not lie substantially in plane 109 or plane 112.

An exemplary shape of integral electrically conductive pads 102A-102H are shown in FIGS. 1-4; however, it is understood that integral electrically conductive pads 102A-102H can be different in shape than illustrated in FIGS. 1-4. For example, integral electrically conductive pads 102A-102H can be square, rectangular, triangular, oval and other polygonal and non-polygonal shapes.

Figure 4:
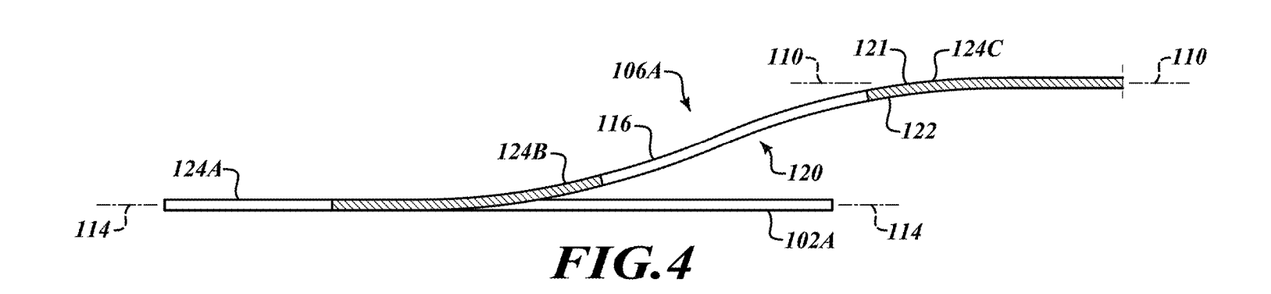
FIG. 4 is a cross-section taken along line 4-4 in FIG. 2.

The following description of features of integral electrically conductive supports 106A-106H is provided with reference to only integral electrically conductive support 106A; however, the description is equally applicable to each electrically conductive support 106A-106H. As illustrated in FIGS. 1, 3 and 4, integral electrically conductive supports 106A-106H extend from plane 109 (in which electrically conductive frame 108 lies) downward to plane 112 (in which integral electrically conductive tabs 102A-102H lie). Integral electrically conductive support 106A is formed from an electrically conductive material such as those described above with reference to electrical connector 100. Integral electrically conductive support 106A includes a section having a width that is constant along the length of conductive support 106A. For example, in FIG. 2, electrically conductive support 106A has a width that is constant between the contour lines and slightly beyond. Integral electrically conductive support 106A includes at least a first electrically conductive band 116 and a second electrically conductive band 118. Though integral electrically conductive support 106A is illustrated as including two electrically conductive bands 116, 118, it should be understood that integral electrically conductive support 106A could include fewer or more electrically conductive bands. For example, integral electrically conductive support 106A may include only one electrically conductive band or it may include more than two electrically conductive bands. When electrically conductive support 106A includes only one conductive band, conductive support 106A is able to rotate more freely along the longitudinal axis of the band compared to when conductive support 106A includes more than one band. Rotation of conductive support 106A in this manner may cause conductive tab 102A to tilt in a way that results in a smaller portion of conductive tab 102A being in direct contact with the terminal of an underlying portable electrical energy storage cell. When the size of the area of contact between conductive tab 102A and the terminal of an underlying portable electrical energy storage cell is reduced, the size of the area available to thermally fuse tab 102A to the terminal of the underlying cell is reduced, making it more difficult to achieve a reliable attachment. When conductive support 106A includes two or more electrically conductive bands, conductive support 106A is constrained at more points compared to when only conductive band is present, thus reducing the ease with which conductive support 106A may be rotated along a longitudinal axis of the bands. Constraining the ease with which conductive support 106A can be rotated reduces the degree to which conductive tab 102A might be tilted out of a parallel relationship with the upper surface of the terminal of an underlying portable electrical energy storage cell. By reducing the degree to which conductive tab 102A might be tilted out of parallel relationship with the upper surface of the terminal of an underlying portable electrical energy storage cell, a reduction in the area available for thermal fusion is reduced, making it easier to achieve a reliable attachment. With increasing numbers of conductive bands, rotational freedom of conductive support 106A diminishes.

In the embodiment illustrated in FIGS. 1-4, integral electrically conductive support 106A includes an opening 120 passing through integral electrically conductive support 106A from an upper surface 121 to a lower surface 122. First electrically conductive band 116 extends between an edge 123 of integral electrically conductive support 106A and opening 120. Edge 123 is an outer edge located opposite corresponding opening 120. Second electrically conductive band 118 extends between another edge 125 of integral electrically conductive support 106A and opening 120. Edge 125 is an outer edge located opposite corresponding opening 120. Opening 120 is illustrated as an oval; however, it should be understood that opening 120 may have a different shape such as a polygon or other non-polygon shape and is not limited to an oval shape. In addition, the location of opening 120 within integral electrically conductive support 106A is not limited to the location illustrated in the figures. For example, opening 120 can be positioned within integral electrically conductive support 106A closer to electrically conductive tab 102A or further away from electrically conductive tab 102A.

In some embodiments, opening 120 is provided within a respective one of integral electrically conductive supports 106A-106H and extends between corresponding bands 116 and 118. A distance between outer edges of the bands 116 and 118 is substantially equal to a width of portions of the respective one of integral electrically conductive supports 106A-106H through which opening 120 does not pass. In some embodiments, opening 120 is formed within a respective one of integral electrically conductive supports 106A-106H and extends between corresponding bands 116 and 118. In these embodiments, a distance between outer edges of the bands 116 and 118 is less than a width of portions of the respective one of integral electrically conductive supports 106A-106H through which opening 120 does not pass. In some embodiments, an opening 120 is formed within a respective one of integral electrically conductive supports 106A-106H and extends between corresponding bands 116 and 118. In these embodiments, a distance between outer edges of the bands 116 and 118 is greater than a width of portions of the respective one of integral electrically conductive supports 106A-106H through which opening 120 does not pass.

Figure 5:
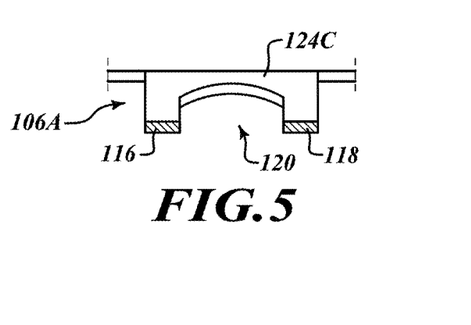
FIG. 5 is a cross-section taken along line 5-5 in FIG. 2.

Referring to FIG. 5, first electrically conductive band 116 has a cross-sectional area that is less than the cross-sectional area of other portions of integral electrically conductive support 106A. The portions of integral electrically conductive support 106A having a larger cross-section area than first electrically conductive band 116 include portions 124A, 124B, 124C in FIGS. 1 and 2. Portions 124A, 124B, 124C are portions of integral electrically conductive support 106A though which opening 120 does not pass. In a similar fashion, second electrically conductive band 118 has a cross-sectional area that is less than the cross-sectional area of another portion of integral electrically conductive support 106A. The cross-sectional area of bands 116 and 118 are illustrated as being equal; however, embodiments described herein are not limited to bands having equal cross-sectional areas. For example, one conductive band may have a cross-sectional area that is less than other conductive bands making up a portion of the conductive support. The conductive band having a smaller cross-sectional area will more readily melt or "fry" (compared to the band having a larger cross-sectional area) when an electrical current above a threshold amount flows through the band. The melting or frying of the conductive band electrically isolates the portable electrical energy storage cell to which the conductive band is connected by a respective conductive tab.

Band 116 and/or band 118 included in electrical connectors formed in accordance with embodiments described herein are able to electrically isolate a portable electrical energy cell from other portable electrical energy storage cells attached to the same connector when electric current flowing through the band(s) exceed a threshold level. For example, in the event an individual portable electrical energy storage cell connected to the electrical connector fails, current from other portable electrical energy storage cells connected to the same electrical connector may flow to the failed cell through the electrical connector. In accordance with embodiments described herein, bands 116, 118 support this current flow until such time the current becomes so large it exceeds the threshold level and the band(s) cannot support the current. When this occurs, the band(s) fail (e.g., melt or "fry") causing a break in the electrical current path to the failed or failing portable electrical energy storage cell. This break in electrical current path prevents current from portable electrical energy cells which have not failed from further damaging the failed or failing portable electrical energy storage cell. The break also prevents electrical energy released from the failed or failing portable electrical energy storage cell from flowing to and damaging other portable electrical energy storage cells connected to the same electrical connector as the failed or failing cell.

The cross-sectional area of bands 116, 118 should be large enough that the bands support a minimum amount of electrical current required under normal operating conditions of the device being powered by the portable electrical energy device, including high load conditions. On the other hand, the cross-sectional area of bands 116, 118 should not be so large that the band(s) do not melt or fry when current levels above a threshold level begin to flow through the bands. An exemplary threshold level of current would be an amount of current greater than the amount of current that would flow under normal operating conditions of the device powered by the portable electrical energy storage device without the presence of any failed or failing electrical energy storage cells connected to the electrical connector. For example, a threshold level of current would be an amount of electric current (greater than the electrical current that flows through the bands under normal operation conditions) that flows to a failed or failing electrical energy storage cell (connected to an electrical connector) from electrical energy storage cells connected to the same electrical connector that have not failed or are not failing. In another exemplary embodiment, a threshold level of current would be an amount of electrical current (greater than the electrical current that flows through the bands under normal operation conditions) that flows from a failed or failing electrical energy storage cell connected to an electrical connector to other electrical energy storage cells that are not failing.

While not intending to be bound by any theory, it is believed that a factor that contributes to the instability and/or failure of a portable electrical energy storage cell is the amount of thermal energy to which the portable electrical energy storage cell is exposed. The amount of thermal energy the portable electrical energy cell is exposed to affects the temperature to which the portable electrical energy cell rises. As the temperature of the portable electrical energy storage cell increases, the stability of the cell becomes less predictable and the risk of damage to internal or external components of the portable electrical energy storage cell and/or the risk that the cell cathode may react with and decompose the electrolyte solution increases. Reaction of the cathode with the electrolyte provides another source of undesirable thermal energy and reactive gases, such as hydrocarbons. Under such conditions, these gases may cause internal pressure within the cell to increase and the temperature of the cell to increase further, potentially to a level that results in ignition of the cell electrolyte in the presence of oxygen or an increase in the temperature of adjacent cells to undesirable levels.

When a portable electrical energy storage cell connected to an electrical connector formed in accordance with embodiments described herein fails, the electrical current flowing from the failing cell may cause the temperature of other portable electrical energy storage cells connected to the same electrical connector to increase. Alternatively, electrical energy from other non-failing portable electrical energy storage cells connected to the electrical connector to which the failing cell is attached may cause the temperature of those cells or the failing cell to increase. Such increases in the temperature of the non-failing or failing cells cause the cells to be less stable and more prone to failure.

Embodiments in accordance with other aspects of the described subject matter include methods of manufacturing an electrical connector for electrical connection to a plurality of portable electrical energy storage cells making up a portable electrical energy storage device. Electrical connectors in accordance with aspects of the disclosed embodiments are manufactured from electrically conductive materials, such as metals or metal alloys, including nickel or nickel alloys. In an exemplary embodiment, the electrical connectors are manufactured from an electrically conductive substrate. The electrically conductive substrate is machined using metal working techniques to form the integral electrically conductive tabs, integral electrically conductive supports, and integral electrically conductive bands. Examples of metal working techniques include bending, pressing, milling and cutting. Examples of useful cutting techniques include laser or plasma cutting and examples of useful milling techniques include use of a computerized numerical control (i.e., CNC) machining. Such techniques are used to form the plurality of integral electrically conductive tabs, plurality of integral electrically conductive supports, conductive bands and the electrically conductive frame out of the electrically conductive substrate. In accordance with embodiments described herein, the cutting or milling techniques are used to form one or more electrically conductive bands in one of the plurality of electrically conductive supports that extend from one of the integral electrically conductive tabs. Each of the electrically conductive bands has a cross-sectional area less than a cross-sectional area of another portion of the integral electrically conductive support that extends from one of the integral electrically conductive tabs. These electrically conductive bands can be formed numerous ways, including forming an opening or void that passes through the integral electrically conductive supports or by removing portions of an edge of the integral electrically conductive supports. Band formation is not limited to forming an opening or removing edges of the electrically conductive supports. The bands can be formed using other techniques.

The bending or forming techniques may be used to shape the electrically conductive substrate so that the electrically conductive tabs lie in a plane different from the plane in which the portion of the electrically conductive substrate making up the electrically conductive frame lies.

In accordance with an exemplary described embodiment, an integral electrically conductive tab is attached to a terminal of a portable electrical energy storage cell using thermal fusing techniques (e.g., spot welding or projection welding). Such techniques generate thermal energy at the conductive tab, for example, via resistive heating. The thermal energy causes the temperature of discrete locations within the tab to increase to a level where the integral electrically conductive tab thermally fuses (e.g., is welded) to a terminal of a portable electrical energy storage cell in contact with the conductive tab. The temperature needed to thermally fuse the integral electrically conductive tab to the portable electrical energy storage cell terminal depends, in part, upon the composition of the integral electrically conductive tab and the portable electrical energy storage cell terminal, the thickness of the conductive tab and target time for completing the thermal fusion. The thermal fusion process should be controlled so the temperature of the tab and terminal are elevated just enough to create an effective attachment between the two, but not so high or for so long a time that damage to the electrical energy storage cell, including its terminal, occurs, or is so high or maintained for such a long period of time that unwanted chemical reactions within the cell are initiated. Practicing methods in accordance with embodiments described herein, utilizing electrical connectors of the type described herein, permits reliable attachment of integral electrically conductive tabs to portable electrical energy storage cell terminals. The electrical connectors formed in accordance with embodiments described herein are able to electrically isolate a failing or failed portable electrical energy storage cell from other cells connected to the same electrical connector. Electrically isolating the failing or failed cell from other cells reduces the chances that the other cells will be damaged or will become unstable due to elevated temperatures.

An exemplary technique for attaching an integral electrically conductive tab to a terminal of an electrical energy storage cell includes spot welding. A spot welder contacts electrodes with an electrically conductive tab in at least two locations. An electric potential between the electrodes causes an electric current to flow through the points of contact between the electrodes and the conductive tab. The small size of the contact area between the electrodes and the electrically conductive tab results in a large current flowing through the contact points. These large currents cause a portion of the conductive tab to melt. Pressure from the electrodes promotes the fusion of the melted portion of the conductive tabs to the underlying terminal of an electrical energy storage cell.

The foregoing detailed description has set forth various embodiments of the devices via the use of schematic illustrations and examples. Insofar as such schematics and examples contain one or more functions and/or operations, it will be understood by those skilled in the art that each function and/or operation within such structures and examples can be implemented, individually and/or collectively, by a wide range of hardware and combinations thereof. The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary, to employ concepts of the various patents, applications and publications to provide yet further embodiments.

While generally discussed in the environment and context of power systems for use with personal transportation vehicles such as all-electric scooters and/or motorbikes, the teachings herein can be applied in a wide variety of other environments, including other vehicular as well as non-vehicular environments. Further, while illustrated with reference to specific shapes and orientations, the illustrations and descriptions are not intended to be exhaustive or to limit the embodiments to the precise forms illustrated. For example, electrical energy storage cells need not be round cylinders, but could take different shapes such as square cylinders, square boxes or rectangular boxes. Similarly, embodiments utilizing one electrical energy storage cell module have been illustrated and described; however, such descriptions are not intended to be exhaustive or to limit the embodiments described herein to such precise configuration. For example, electrical energy storage cell modules may be placed side by side and separated by the electrical energy storage cell barriers including layers of thermal insulating material and layers of elastic material. The above description of illustrated embodiments, including what is described in the Abstract, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art.

In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An electrical connector for making an electrical connection to a plurality of portable electrical energy storage cells, the electrical connector comprising:
   a. an electrically conductive frame;
   b. a plurality of integral electrically conductive tabs in electrical communication with the electrically conductive frame; and
   c. a plurality of integral electrically conductive supports that connect each of the plurality of integral electrically conductive tabs to the electrically conductive frame, wherein each of the integral electrically conductive support extends between a corresponding one of the plurality of integral electrically conductive tabs and the electrically conductive frame and has a cross-sectional area sufficient to open the connection between the corresponding tab and the frame if a current from an energy storage cell exceeds a threshold level at which at least one of the plurality of integral electrically conductive supports start to fail.

2. The electrical connector of claim 1, wherein the individual integral electrically conductive support includes an upper surface and a lower surface and an opening extending from the upper surface to the lower surface that splits the conductive support into a first conductive band and a second conductive band.

3. The electrical connector of claim 1, wherein the plurality of integral electrically conductive tabs lie in a plane different from a plane in which the electrically conductive frame lies.

4. The electrical connector of claim 2, the first and second conductive bands have different cross-sectional areas.

5. The electrical connector of claim 2, further comprising a third conductive band, wherein the first, second and third conductive bands have different cross-sectional areas.

6. The electrical connector of claim 4, wherein the at least one electrically conductive band is coupled to the corresponding tab via a curved portion.

7. The electrical connector of claim 2, wherein the individual integral electrically conductive support includes a section having a cross-sectional area that is greater than the first conductive band and the second conductive band.

8. The electrical connector of claim 1, wherein the at least one electrically conductive band is configured to electrically isolate the corresponding tab and the electrically conductive frame.

9. The electrical connector of claim 1, wherein the at least one electrically conductive band is configured to cause a break in an electrical current path between the corresponding tab and the electrically conductive frame.

10. The electrical connector of claim 1, wherein the corresponding tab includes a circular structure.

11. An electrical connector for making an electrical connection to a plurality of portable electrical energy storage cells, the electric connector comprising:
    a. an electrically conductive frame;
    b. a plurality of integral electrically conductive tabs in electrical communication with the electrically conductive frame; and
    c. a plurality of integral electrically conductive supports that connect each of the plurality of integral electrically conductive tabs to the electrically conductive frame, wherein each of the integral electrically conductive support extends between a corresponding one of the plurality of integral electrically conductive tabs and the electrically conductive frame and has a cross-sectional area sufficient to open the connection between the corresponding tab and the frame if a current from an energy storage cell exceeds a threshold level at which at least one of the plurality of integral electrically conductive supports start to fail;
    wherein the individual integral electrically conductive support includes a first edge and a second edge, and wherein the opening is between the first edge and the second edge, and wherein the first electrically conductive band is between the first edge and the opening and a second electrically conductive band is between the second edge and the opening.

12. An electrical connector for making an electrical connection to a plurality of portable electrical energy storage cells, the electrical connector comprising:
    a. an electrically conductive frame;
    b. a plurality of integral electrically conductive tabs in electrical communication with the electrically conductive frame; and
    c. a plurality of integral electrically conductive supports that connect each of the plurality of integral electrically conductive tabs to the electrically conductive frame, wherein each of the integral electrically conductive support extends between a corresponding one of the plurality of integral electrically conductive tabs and the electrically conductive frame and has a cross-sectional area sufficient to open the connection between the corresponding tab and the frame if a current from an energy storage cell exceeds a threshold level at which at least one of the plurality of integral electrically conductive supports start to fail;
    wherein the at least one electrically conductive band is configured to be melted in response to an event that an electrical current passing through the at least one electrically conductive band exceeds a threshold level.

* * * * *